Figure 1:
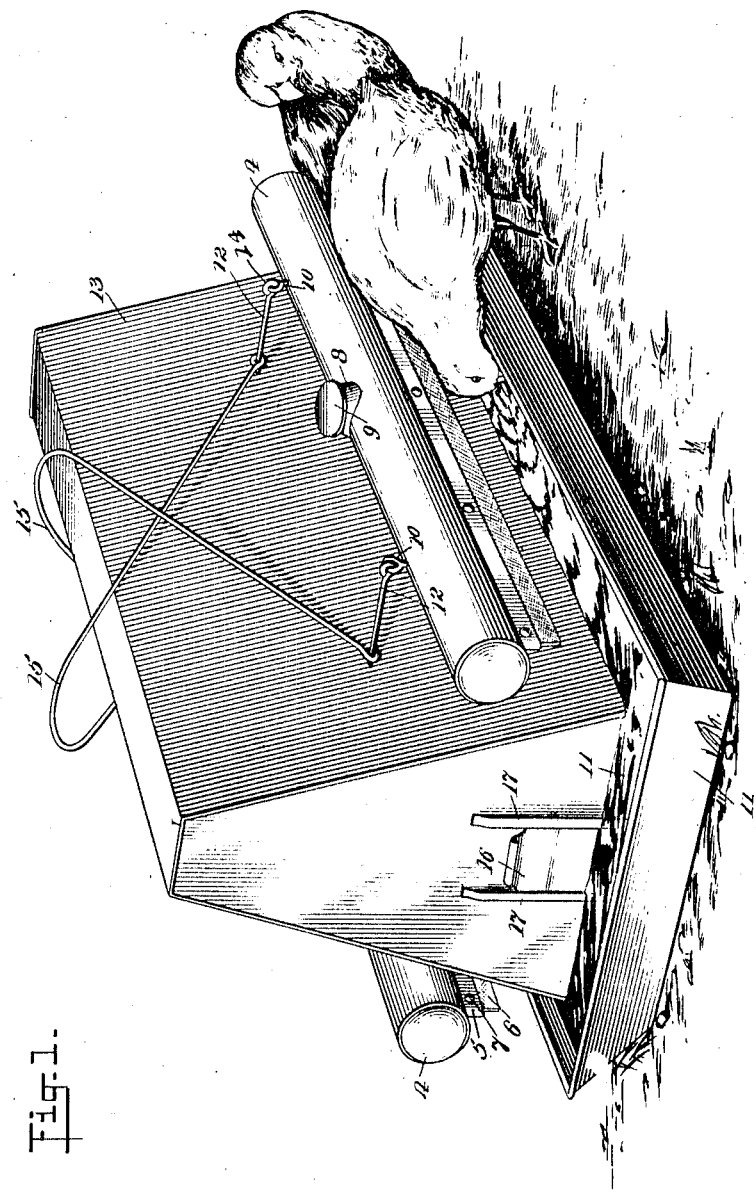

A. F. SHULER.
POULTRY INSECTICIDE APPLICATOR.
APPLICATION FILED MAY 27, 1910.

988,669.

Patented Apr. 4, 1911.
2 SHEETS—SHEET 1.

WITNESSES:

INVENTOR
Andrew F. Shuler
BY
ATTORNEYS

A. F. SHULER.
POULTRY INSECTICIDE APPLICATOR.
APPLICATION FILED MAY 27, 1910.
988,669.
Patented Apr. 4, 1911.
2 SHEETS—SHEET 2.
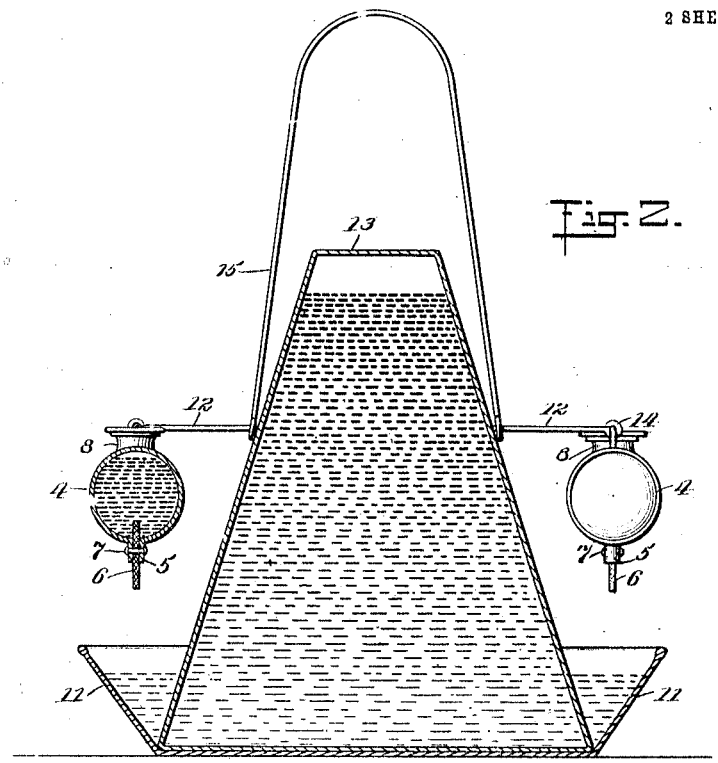
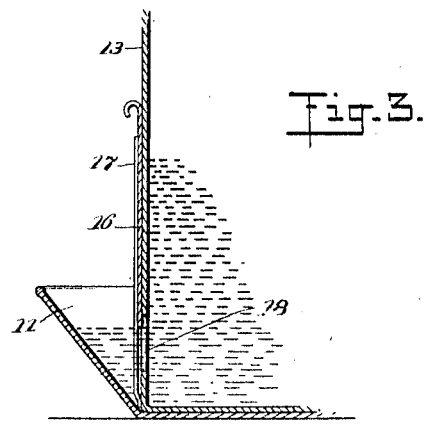
WITNESSES:
INVENTOR
Andrew F. Shuler
BY
ATTORNEYS

UNITED STATES PATENT OFFICE.

ANDREW F. SHULER, OF ARCANUM, OHIO.

POULTRY-INSECTICIDE APPLICATOR.

988,669. Specification of Letters Patent. Patented Apr. 4, 1911.

Application filed May 27, 1910. Serial No. 563,727.

*To all whom it may concern:*

Be it known that I, ANDREW F. SHULER, a citizen of the United States, and a resident of Arcanum, in the county of Darke and State of Ohio, have invented a new and Improved Poultry-Insecticide Applicator, of which the following is a full, clear, and exact description.

Among the principal objects which the present invention has in view are: to provide a reservoir for suitable liquid insecticides, said reservoir having connected therewith a wick or other transferring device for spreading on the head or body of poultry or animals, the insect destroying liquid; to provide a reservoir of the character above set forth, elongated to cover the maximum space and having hanging or supporting means therefor, whereby the reservoir may be placed in position to discontinue the oil delivered therefrom; and to provide an applicator of the character described constructed and arranged to form a simple, durable and efficient apparatus for the purpose specified.

One embodiment of the present invention is disclosed in the structure illustrated in the accompanying drawings, in which like characters of reference denote corresponding parts in all the views, and in which—

Figure 1 is a perspective view of a poultry drinking fountain having connected therewith insecticide applicators constructed and arranged in accordance with the present invention; Fig. 2 is a cross section of the fountain having the applicators connected therewith; and Fig. 3 is a fragmentary view in vertical section, showing the construction and arrangement of a water supply gate disposed between the trough and reservoir of the said fountain.

It is well known that if kerosene or other oil, or certain prepared liquid insecticides, are spread on the bodies of small chickens, and particularly on the heads thereof, a large proportion of the diseases at present fatal to chickens in the early stage of life will be avoided.

To apply the necessary insecticide in a manner giving the least trouble to the attendant and least distress to the chickens, is the object of the present invention.

I have shown in the accompanying drawings the adaptation of my applicator to a drinking fountain of convenient shape for poultry. The applicators consist of tubes 4, 4 of any desired or suitable size. The ends of the tubes are closed, as shown in the drawings. An elongated slot is formed, which slot is surrounded by depended parallel walls 5, 5 forming lips to guide and hold the wicks 6, 6. The wicks 6, 6 are held in the walls 5, 5 by means of small rivets 7, 7. I prefer the use of the rivets 7, 7 as the removal of the same permits the replenishing of the wicks 6, 6. The tube 4 forms a reservoir which is fed through an opening in the top of the dome 8 suitably formed to retain a cover or cap 9.

The applicator constructed as above described, is suspended from eyelets 10, 10 securely mounted in the applicator. In the employment of the applicator in conjunction with the drinking fountain shown in the drawings, the tube 4 is suspended directly above a trough 11. In being suspended in this position, the tube is supported by rods 12, 12 fixedly secured in the body 13 constituting the reservoir of the fountain. The rods 12, 12 are extended so that the wicks 6, 6 are so disposed that they are touched by and deflected by the heads of the chickens when raised from the trough 11 in the act of swallowing. As the head is then withdrawn, the wick is drawn forward toward the bill, wiping the head and slightly ruffling the feathers to apply the insecticide upon the under surface of the feathers.

When not in use for applying the insecticide, the tubes 4, 4 are rotated upward on eyelets 14, 14 and the body of the tubes 4, 4 rested on the rods 12. In this position the wicks 6, 6 will be upturned and the liquid contained in the tubes 4, 4 will not flow by gravity into the said wicks where the same would be lost through evaporation or otherwise. This mounting is further advantageous in the case of chickens unfamiliar with the applicator, the tubes may be thus raised to familiarize the chickens by sight with the fact that the tubes are used in conjunction with the fountain and do not interfere with them. Later, when they have become accustomed to seeing the tubes connected with the applicator and when the same are downturned in operative position, the unfamiliarity of the sight of the fountain will not impress them to the extent it otherwise might. The rods, 12, 12 when used in connection with a fountain formed as shown in the drawings, further serve as pivotal mountings for the carrying bails 15, 15, by means of which the fountain with the applicators attached may be conveniently moved from point to point.

In Fig. 3 of the drawings I have shown a form of construction whereby the water contained in the body 13 may be limited in flow as to height in the trough 11. The limitation here is controlled by the door 16 which slides in guides 17, 17 to increase or diminish the opening 18 in the side of the body 13, and through which the drinking water flows. By raising or lowering the gate 16, the opening 18 is increased or diminished and thereby the height of the water in the trough is proportionately increased or diminished. The water in the trough, as it is well known, will not flow above a certain distance above the upper edge of the opening formed by the door 16, when the body of the reservoir is not supplied by air except through the said delivery opening. For reasons of economy I sometimes substitute for the slide gate 16 a cap or plug.

While the invention has been herein described and illustrated as employed in connection with poultry, it will be understood that the same may be used for spreading insecticide or vermicide, when in liquid form, upon the heads or bodies of animals such as hogs, sheep, ducks, etc. The preferred location for mounting the applicator, is, as above described, suspended above a water drinking trough, and this for the reason that the most important portion of the body to be preserved from the inroads of such insects as lice, is the head of the animal. A larger application may, however, be made by providing run-ways for the travel of animals in corrals, kennels or similar structures, and in suspending the applicator above the said run-ways where the body of the animal will wipe the wick 6 and receive therefrom the oil with which the said wick is saturated.

Having thus described my invention, what I claim as new and desire to secure by Letters Patent, is:—

A poultry insecticide applicator comprising an elongated tube having formed therein a longitudinally disposed slot and provided with a filling opening; hanging devices mounted upon said tube and on the side thereof opposite the said slot; a percolating flexible material disposed in said slot; a plurality of bracket members to engage said hanging devices to support said tube; and a closure device for the filling opening in said tube.

In testimony whereof I have signed this specification in the presence of two subscribing witnesses.

ANDREW F. SHULER.

Witnesses:
LEROY BRANDENBURG,
A. M. FLORY.